United States Patent

Elias

[11] 4,298,906
[45] Nov. 3, 1981

[54] CAPACITOR AND ELEMENT THEREFOR

[75] Inventor: William H. Elias, Six Mile, S.C.

[73] Assignee: Sangamo Weston, Inc., Norcross, Ga.

[21] Appl. No.: 74,177

[22] Filed: Sep. 10, 1979

[51] Int. Cl.$^3$ .............................................. H01G 9/00
[52] U.S. Cl. ................................... 361/433; 361/272
[58] Field of Search ..................... 361/433, 272, 275

[56] References Cited

U.S. PATENT DOCUMENTS

| | | | |
|---|---|---|---|
| 2,604,517 | 7/1952 | Brennan | 361/433 |
| 2,994,809 | 8/1961 | Jenny et al. | 361/433 |
| 3,010,056 | 11/1961 | Kurland et al. | 361/433 |
| 3,611,051 | 10/1971 | Puppolo | 361/433 |
| 3,832,607 | 8/1974 | Obenchain | 361/433 |
| 3,938,228 | 2/1976 | Kemkers et al. | 361/433 |

FOREIGN PATENT DOCUMENTS 1401395  7/1975  United Kingdom ............... 361/433

*Primary Examiner*—Andrew J. James
*Attorney, Agent, or Firm*—Joseph J. Kaliko; Mikio Ishimaru; Dale Gaudier

[57] ABSTRACT

A capacitor which includes a case containing a capacitor element with a pair of unequal length overlapping tabs extending therefrom. A header for sealing the case carries a pair of leads. Each tab is welded to one of the leads with an insulator interposed between the tabs.

3 Claims, 2 Drawing Figures

CAPACITOR AND ELEMENT THEREFOR

BACKGROUND OF THE INVENTION

The present invention relates generally to minimizing impedance in capacitors and more particularly to low resistance, low inductance capacitors having a standardized outside configuration.

All capacitors have series equivalent circuits with impedance consisting of capacitance, resistance, and inductance parameters, and conventional electrolytic capacitors have resonant frequencies between 5 and 100 kilohertz depending on size, voltage rating, and construction. At frequencies below the resonant frequency, the capacitor impedance is primarily capacitive and is minimized by maximizing capacitance. While the total resistance effect, or equivalent series resistance (ESR), has minimal influence on the impedance except at frequencies near the resonant frequency, the effect of ESR is noticeable in heat generation at all frequencies. The effect of the ESR is minimized by minimizing the ESR. Above the resonant frequency, the capacitor impedance is primarily affected by the total inductance, or equivalent series inductance (ESL) and is minimized by minimizing the ESL.

In the past, the capacitors used in conventional D.C. power supplies, which rectified 60 hertz line voltage to supply the desired D.C. level operated in ranges below the resonant frequency and the effects of the ESR and ESL were minimal. With the increased acceptance of switching regulated D.C. power supplies which operate at frequencies between 10 and 100 kilohertz (with resulting 20 to 200 kilohertz ripple and harmonics), new low ESR and ESL capacitors are required because normal operation is in ranges at or above the resonant frequencies. At the same time, certain outside configurations for capacitors have become accepted in the industry such that the low ESR and ESL must be obtained without any changes to the outside configuration.

Various other capacitors have been developed having relatively low ESL's such as those shown in the Puppolo, et al., U.S. Pat. No. 3,822,397 and the Voyles, et al., U.S. Pat. No. 3,806,770. However, the split terminal cover design of the Puppolo patent and the tantalum capacitor design of the Voyles patent are expensive to manufacture.

SUMMARY OF THE INVENTION

The present invention provides a standard outside configuration capacitor with low ESR and ESL, and a capacitor element with insulator separated adjacent tabs which have almost fully interactive electromagnetic fields when carrying current. By overlapping the tabs almost up to their connection to a pair of connector leads, the ESL is substantially minimized.

An unexpected side effect of the adjacent overlapping tabs was that the ESR was significantly reduced. The tabs of conventional capacitors are located on opposite sides of the capacitor element so that longer lengths are required in order to weld the tabs to the connector leads as contrasted to the present invention where the tabs are adjacent to one another. This shortening of the tabs has contributed to the reduction in ESR. While the difference in the length of the tabs was initially not considered significant, testing of the capacitor showed an unexpected, significant effect on ESR in addition to the substantial effect on ESL.

The present invention further provides for the use of a thin, electrically conductive header to reduce the length of the leads and provide a shield to prevent interaction of the electric field of the longer of the two tabs with the electric fields of the leads. This further serves to reduce the ESL.

The above and additional advantages of the present invention will become apparent to those skilled in the art from a consideration of the following detailed description of the preferred embodiment when taken in conjunction with the accompanying drawings.

DESCRIPTION OF THE PREFERRED EMBODIMENT

Figure 1:
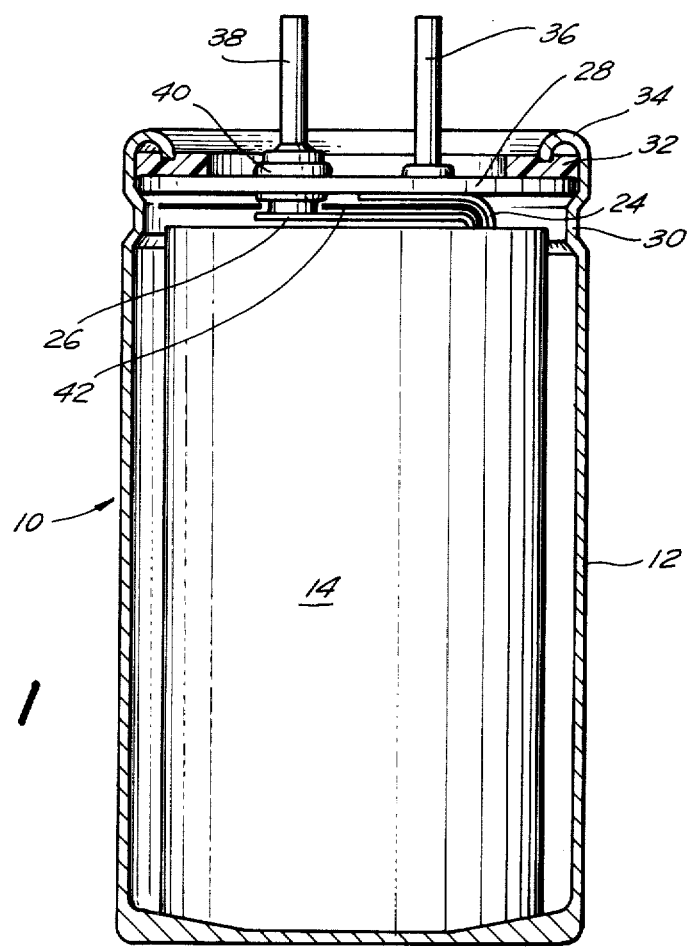
FIG. 1 is a cutaway view of a capacitor embodying the present invention.

Referring now to FIG. 1, therein is shown an electrolytic capacitor 10 having a capacitor case 12 which contains a capacitor element 14.

Figure 2:
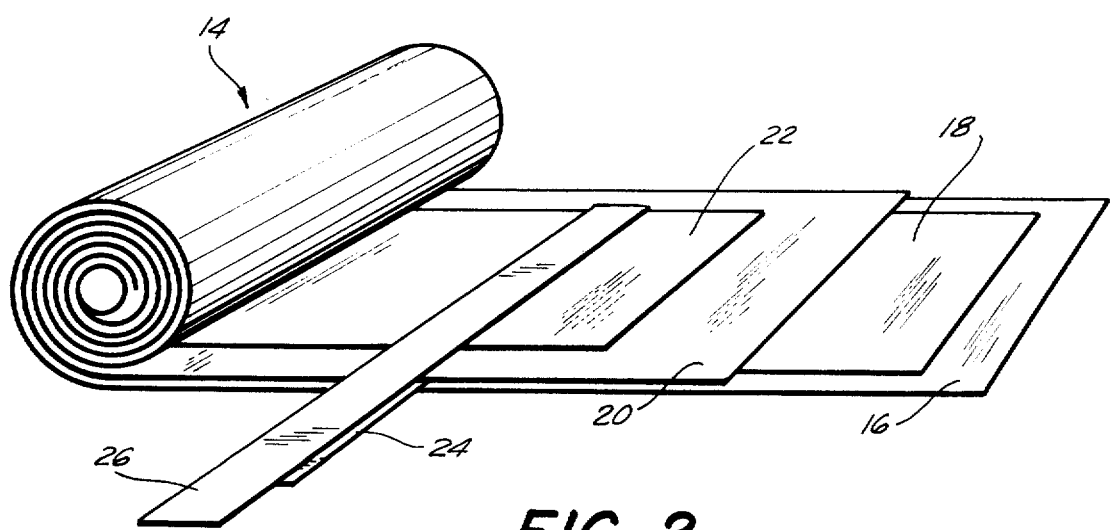
FIG. 2 is an isometric view of a capacitor element of the present invention partially unwound.

Referring now to FIG. 2, it may be seen that the capacitor element 14 is made up of a first spacer film 16 abutting and encircling a first electrode film 18, which in turn encircles and abuts a second spacer film 20. The second spacer film 20 further encircles and abuts a second electrode film 22. The first and second spacer films 16 and 20 are saturated in a conventional manner with a conventional capacitor electrolyte.

The first electrode film 18, the cathode, has a first tab 14 electrically and conductively abutting and extending from the capacitor element 14. Similarly, the second electrode film 22, the anode, has a second tab 26 electrically and conductively abutting it adjacent to the first tab 24. The second tab 26 extends from the capacitor element 14 further than the first tab 24. The first and second tabs 24 and 26 are flat, rectangular shaped pieces of a conductive material, such as aluminum, which are deformable as well as weldable.

Referring again to FIG. 1, it may be seen that the capacitor element 14 is disposed in the capacitor case 12 and is held therein by a header 28. While the header could be made of a plastic, in the preferred embodiment it is made of the conductive material aluminum. A case seal 32 is disposed around the periphery of the header 28 so that by rolling over a portion of the capacitor case 12, designated by the numeral 34, and clamping the header 28 and case seal 32 against an indented portion 30, it is possible to seal the capacitor case 12.

The header 28 carries two terminals, a first lead 36 which is integral therewith and a second lead 38 which is electrically isolated by insulation ring 40 from the header 28.

With the header 28 in place, the first and second tab 24 and 26 overlap between the header 28 and the capacitor element 14. Between the first and second tabs 24 and 26, an insulator spacer 42 is interposed so as to prevent contact therebetween. The insulator spacer 42 encircles the second lead 38 extending below the header 28 to prevent all contact between the second tab 26 and the header 28. The first tab 24 is welded to the header 28 proximate the first lead 36 so as to be electrically connected thereto and the second tab 26 is welded to the second lead 38.

In a typical application, the electrolytic capacitor 10 is mounted on the circuit board of a switching regulated power supply system (not shown). As known to those skilled in the art, such a system consists of a full wave rectifier connected in parallel with a first filter capacitor, to a transistor switching circuit. The transistor switch circuit is connected through a series inductance with a second filter capacitor to a direct current load.

The output of the full wave rectifier is filtered by the first filter capacitor and is chopped by the transistor switching circuit into a pulse train. The series inductance and the parallel second filter capacitor integrate and filter the pulse train to provide the D.C. output. The frequency or duty cycle of the switching circuit is varied to maintain the output at the desired level with variations in the load.

The high frequencies at which the above type of system operates requires the use of low impedance capacitors.

In the capacitor according to the present invention, minimum impedance is achieved by positioning the first and second tabs 24 and 26 were overlapped so as to be as adjacent as possible until connection to the respective first and second leads 36 and 38. This adjacent positioning allows the neutralization of the interaction of electromagnetic fields therebetween and thus minimizes the capacitor inductance. Basically, this works because the electromagnetic fields of any given conductor may be neutralized by passing an equal current in the opposite direction through a second conductor parallel and close to the given conductor. In the preferred embodiment, substantial reductions in the inductance have been achieved from the typical value of 12 to 15 nanohenries to 5 to 6 nanohenries for capacitors in the ¾ to 1 inch diameter range.

In the past, it was the practice to position the tabs at diametrically opposed locations on the capacitor element 14. This configuration required that the tabs be sufficiently long to twist without tearing during bottom welding of the tabs to the leads. In the preferred embodiment, the adjacently located tabs do not need to be twisted and can be short enough to allow the header 28 to be pivoted about the edge adjacent the tabs. Further, the inventor has found that, by providing the tabs so they extend from the capacitor element 14 as close as possible to the first lead 36 so as to minimize tab length, the equivalent series resistance is significantly reduced.

After some evaluation, it has been found that the inductance in the capacitor according to the present invention is now primarily due to the leads as they emerge from the header. Since this is the case, the inductance is then determined by the length and spacing of the leads. The spacing is fixed by virtue of the fact that the two lead capacitor has become universally adopted and used in the industry for this application. Thus the lead length is the only variable.

The inventor minimizes the lead length through the use of the aluminum header 28, first because it is much thinner than the equivalent plastic header, and secondly, more importantly, because it acts to shield the second lead 38 until it exists from the header 28. In the preferred embodiment, the lead length is thus measured from the outside of the header 28 to the point at which it connects to the external circuit.

Thus, with the electrolytic capacitor 10, which has an overlapping tab arrangement combined with an aluminum header, it is possible to obtain the lowest possible ESL and ESR with this standard outside configuration.

While the invention has been described in conjunction with the specific embodiment, it is to be understood that many alternatives, modifications and variations will be apparent to those skilled in the art in light of the aforegoing description. Accordingly, it is intended to embrace all such alternatives, modifications, and variations which fall within the spirit and scope of the appended claims.

What is claimed is:

1. A capacitor comprising: a cylindrical case open at one end and closed at the other; a cylindrical header for closing said open end of said cylindrical case and including first and second leads spaced apart across a diameter of said cylindrical header; a first cylindrically rolled spacer film disposed in said cylindrical case; a cylindrically rolled cathode film abutting and encircled by said first cylindrically rolled spacer film; a second cylindrically rolled spacer film abutting and encircled by said cylindrically rolled cathode film; a cylindrically rolled anode film abutting and encircled by said second cylindrically rolled spacer film; a first tab conductively connected to and extending from said cylindrically rolled cathode film at a predetermined circumferential position and bendable across a diameter of said cylindrically rolled cathode film parallel to said diameter of said cylindrical header, said first tab operatively and conductively connected to said first lead and parallel to said diameter of said cylindrical header; a second tab conductively connected to and extendeing from said cylindrically rolled anode film proximate said predetermined circumferential position of said first tab at said cylindrically rolled cathode film and bendable across said diameter of said cylindrically rolled cathode film, said second tab overlapped by and longer than said first tab, said second tab extending beyond said first lead and conductively connected to second lead; and insulator spacer means disposed around said second lead and interposed between said first and second tabs to prevent contact therebetween.

2. The capacitor as claimed in claim 1, wherein said cylindrical header is conductive and said first lead is conductively connected thereto, and said first tab is conductively connected proximate to the center of said header.

3. The capacitor as claimed in claim 2 wherein said second lead is insulated from said cylindrical header, and said second tab is conductively connected to said second lead proximate said insulator spacer means.

* * * * *